US00RE45845E

(19) United States
(12) Reissued Patent
Men et al.

(10) Patent Number: US RE45,845 E
(45) Date of Reissued Patent: Jan. 19, 2016

(54) CUTTING TOOL AND ROUND DOUBLE SIDED CUTTING INSERT THEREFOR

(71) Applicant: Iscar, Ltd., Tefen (IL)

(72) Inventors: Yuri Men, Haifa (IL); Amir Satran, Kfar Vradim (IL)

(73) Assignee: ISCAR, LTD., Tefen (IL)

(21) Appl. No.: 14/305,687

(22) Filed: Jun. 16, 2014

Related U.S. Patent Documents

Reissue of:
(64) Patent No.: 8,206,066
Issued: Jun. 26, 2012
Appl. No.: 12/507,843
Filed: Jul. 23, 2009

(30) Foreign Application Priority Data

Aug. 31, 2008 (IL) ..... 193779

(51) Int. Cl.
*B23B 27/16* (2006.01)
*B23C 5/20* (2006.01)
*B23C 5/22* (2006.01)

(52) U.S. Cl.
CPC . *B23B 27/16* (2013.01); *B23C 5/20* (2013.01); *B23C 5/202* (2013.01); *B23C 5/207* (2013.01); *B23C 5/2213* (2013.01); *B23C 2200/128* (2013.01); *B23C 2200/201* (2013.01)

(58) Field of Classification Search
CPC ..... B23B 27/16; B23C 5/20; B23C 5/202; B23C 5/207; B23C 5/2213; B23C 2200/128; B23C 2200/203
USPC ..... 407/113, 42
IPC ..... B23B 27/16; B23C 5/20, 5/202, 5/207, B23C 5/2213, 2200/128, 2200/203
See application file for complete search history.

(56) References Cited

U.S. PATENT DOCUMENTS 3,289,271 A * 12/1966 Stier ..... 407/113
3,541,655 A * 11/1970 Stier ..... 407/113

(Continued)

FOREIGN PATENT DOCUMENTS

DE 20020271 U1 1/2002
DE 102005043842 3/2007

(Continued)

OTHER PUBLICATIONS

Extended search report dated Mar. 11, 2015 issued in European counterpart application (No. 14199208.1).

(Continued)

*Primary Examiner* — Sara Clarke
(74) *Attorney, Agent, or Firm* — Womble Carlyle Sandridge & Rice PLLC

(57) ABSTRACT

A cutting insert for retention in a rotating cutting tool having an axis of rotation has two opposing end surfaces and a peripheral surface extending therebetween, each end surface having a mutual first axis of symmetry passing through the end surfaces about which each end surface has N-fold rotational symmetry for some value of N where N is chosen from the group consisting of 2, 3 and 4. A peripheral cutting edge is formed at the junction between each end surface and the peripheral surface, the peripheral cutting edge having N curved cutting edges merging with N straight cutting edges which extend between the curved cutting edges at extremities thereof. The curved cutting edges of the two end surfaces are not aligned in an end view of the cutting insert along the first axis of symmetry.

48 Claims, 11 Drawing Sheets

(56) References Cited

U.S. PATENT DOCUMENTS

| | | | | | |
|---|---|---|---|---|---|
| 3,762,005 | A | * | 10/1973 | Erkfritz | 407/113 |
| 3,821,836 | A | * | 7/1974 | Ohtsu | 407/114 |
| 4,074,949 | A | | 2/1978 | Hochmuth et al. | |
| 4,175,896 | A | | 11/1979 | Kishinami et al. | |
| 4,297,058 | A | * | 10/1981 | Armbrust et al. | 407/113 |
| 4,512,689 | A | | 4/1985 | Bylund | |
| 5,622,460 | A | * | 4/1997 | Satran et al. | 407/42 |
| 5,772,364 | A | | 6/1998 | Satran et al. | |
| 6,575,670 | B2 | | 6/2003 | Men | |
| 6,607,333 | B2 | * | 8/2003 | Satran et al. | 407/33 |
| 6,840,716 | B2 | * | 1/2005 | Morgulis et al. | 407/34 |
| 7,094,007 | B2 | | 8/2006 | Satran et al. | |
| 7,118,312 | B2 | | 10/2006 | Norstroem et al. | |
| 7,232,279 | B2 | * | 6/2007 | Smilovici et al. | 407/113 |
| 7,494,303 | B2 | * | 2/2009 | Koskinen | 407/113 |
| 7,722,297 | B2 | | 5/2010 | Dufour et al. | |
| 7,976,250 | B2 | * | 7/2011 | Fang et al. | 407/113 |
| 2006/0210364 | A1 | | 9/2006 | Bellmann et al. | |
| 2006/0245837 | A1 | | 11/2006 | Dufour et al. | |
| 2007/0003384 | A1 | | 1/2007 | Smilovici et al. | |

FOREIGN PATENT DOCUMENTS

| | | | |
|---|---|---|---|
| EP | 0054481 | A1 | 6/1982 |
| EP | 0300247 | A1 | 1/1989 |
| EP | 0574376 | A1 | 12/1993 |
| EP | 0925863 | A2 | 6/1999 |
| JP | H10-263916 | | 10/1998 |
| JP | 2008-018515 | | 1/2008 |
| WO | 2004/002664 | A2 | 1/2004 |
| WO | WO 2004/094092 | | 11/2004 |

OTHER PUBLICATIONS

International Search Report, PCT/IL2009/000814, dated Dec. 21, 2009.

International Preliminary Report on Patentability in counterpart international application No. PCT/IL2009/000814, completed Mar. 12, 2010.

* cited by examiner

CUTTING TOOL AND ROUND DOUBLE SIDED CUTTING INSERT THEREFOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a milling cutting insert having rounded cutting edges and particularly to a double-sided cutting insert of such a kind.

BACKGROUND OF THE INVENTION

When producing turbine blades, the final machining stage of the internal surface of the turbine blade is typically done by means of milling cutting inserts having round cutting edges. In such a case, the total usable sector used to cut by such a cutting insert is usually greater than 120°, therefore, the cutting insert may be indexed only two times since a third indexing would not be able to utilize a full range sector, i.e., a cutting edge spanning more than 120°.

Known round cutting inserts or cutting inserts having round cutting edges are often single sided, and, as mentioned, may fully utilize only two cutting edges. For example, U.S. Pat. No. 4,175,896 discloses a single sided cutting insert having two arcuate cutting edges which are eccentric to each other and separated from each other by diametrically symmetric flat faces.

Round double sided cutting inserts are typically ceramic inserts and are devoid of a central through bore for the passage of a clamping screw. The lack of a through bore is a disadvantage since it requires utilizing a more complex and expensive retaining system.

It is an object of the present invention to provide a double-sided indexable cutting insert having four or more round cutting edges.

It is an object of the present invention to provide a double-sided indexable cutting insert having four round cutting edges wherein each of the cutting edges extends more than 120°.

It is an object of the present invention to provide a tool holder for a double sided cutting insert having four rounded cutting edges and a through bore, the cutting insert being retained within the tool holder by means of a clamping screw that passes through the through bore.

SUMMARY OF THE INVENTION

In accordance with the present invention there is provided a cutting insert for retention in a rotating cutting tool having an axis of rotation, the cutting insert comprising: two opposing end surfaces and a peripheral surface extending therebetween, each end surface having a mutual first axis of symmetry passing through the end surfaces about which each end surface has N-fold rotational symmetry for some value of N where N is chosen from the group of 2, 3 and 4; a peripheral cutting edge formed at the junction between each end surface and the peripheral surface, the peripheral cutting edge comprising N curved cutting edges merging with N straight cutting edges which extend between the curved cutting edges at extremities thereof; wherein: the curved cutting edges of the two end surfaces are not aligned in an end view of the cutting insert along the first axis of symmetry.

Typically, N cutting edge axes, located in a mid portion of each of the N curved cutting edges, extend parallel to the first axis of symmetry, and each of the N curved cutting edges of one of the end surfaces is rotated about its associated cutting edge pivot axis relative to an opposite curved cutting edge of the other end surface, as seen in an end view of the cutting insert along the first axis of symmetry.

Advantageously, each of the N curved cutting edges lies on a torus.

Further advantageously, each operative curved cutting edge sweeps out a portion of a torus when the cutting insert is retained in the rotating cutting tool and the rotating cutting tool is rotated about its axis of rotation by 360°.

In one embodiment, one extremity of any given curved cutting edge is located further from a median plane of the cutting insert than the other extremity of the given curved cutting edge, the median plane being located midway between the end surfaces.

In one embodiment, the curved cutting edges associated with one of the end surfaces are located in a first reference plane and the curved cutting edges associated with the other end surface are located in a second reference plane, the first and second reference planes being parallel to each other and located equidistant from and on either side of a median plane of the cutting insert, the median plane being located midway between the end surfaces.

Typically, the cutting insert comprises a through bore, having a through bore axis constituting the first axis of symmetry, that extends between the two end surfaces; and the peripheral surface comprises a first, second, third and fourth pairs of side abutment surfaces, each pair of side abutment surfaces has 180° rotational symmetry around the through bore axis.

In one embodiment, the two end surfaces are identical.

If desired, a major portion of each of the curved cutting edges extends along an angle equal to or larger than 120° as seen along the first axis of symmetry.

In one embodiment, a first end surface of the two opposing end surfaces constituting an upper surface defining a first reference plane, a second end surface of the two opposing end surfaces constituting a lower surface defining a second reference plane parallel to the first reference plane; the curved cutting edges comprise a first main cutting edge and a second main cutting edge; in an end view of the cutting insert the first main cutting edge has a first radius of curvature with respect to a first cutting edge axis and the second main cutting edge has a second radius of curvature with respect to a second cutting edge axis, the first cutting edge axis and the second cutting edge axis are parallel to the through bore axis and located at opposite sides thereof; the first cutting edge axis is located a first distance from the second main cutting edge, the through bore axis is located a second distance from the second main cutting edge, and the first distance is smaller than the second distance.

Typically, the cutting insert has 180° rotational symmetry around a second symmetry axis, the second symmetry axis lies on a median plane between the first and the second reference planes, and intersects the peripheral surface at two median insert symmetry points; each of the median insert symmetry points is formed at the intersection of a first reference line with a second reference line, as seen in a first side view of the cutting insert that is perpendicular to a given secondary cutting edge; the first reference line connects the leading end of a first main cutting edge of a given end surface with the leading end of a first main cutting edge of an opposite end surface; and the second reference line connects the trailing end of a second main cutting edge of a given end surface with the trailing end of a second main cutting edge of an opposite end surface.

In one embodiment, the first cutting edge axis and the second cutting edge axis are located at opposite sides of an imaginary plane that is perpendicular to a symmetry plane that contains the first axis of symmetry and the second symmetry axis.

Further in accordance with the present invention there is provided a cutting insert for retention in a rotating cutting tool having an axis of rotation, the cutting insert comprising: two opposing end surfaces and a peripheral surface extending therebetween, each end surface having a mutual first axis of symmetry passing through the end surfaces about which each end surface has 180° rotational symmetry; a peripheral cutting edge formed at the junction between a first end surface, constituting an upper surface, and the peripheral surface, the peripheral cutting edge comprising two curved cutting edges merging with two straight cutting edges which extend between the curved cutting edges at extremities thereof; a continuously extending rake surface extends inwardly from the peripheral cutting edge, the rake surface is slanted at a rake slant angle with respect to a second end surface, constituting a lower surface; the upper surface comprises a rake inner extremity at the innermost extremity of the rake surface and a bore upper end at the uppermost end of a through bore that extends between the end surfaces, a length between a given point on the peripheral cutting edge and the rake inner extremity comprises a first rake length and a length between the given point and the bore upper end comprises a second rake length, the first rake length and the second rake length taken in a plane parallel to the lower surface; wherein: the rake slant angle is equal to or greater than 25°; a rake extension ratio, defined as a ratio between the first rake length and the second rake length, is smaller than 1 and equal to or greater than 0.8; and a major portion of each of the curved cutting edges lies on a torus and extends along an angle equal to or larger than 120° as seen along the first axis of symmetry.

Typically, the peripheral surface comprises a first pair of side abutment surfaces that converge towards each other in a direction toward the upper surface, and, a third pair of side abutment surfaces that converge towards each other in a direction toward the upper surface.

Still further in accordance with the present invention there is provided a cutting tool having a longitudinal axis of rotation and comprising: a tool body having at least one insert pocket formed in a front end of the tool body and a cutting insert retained in the at least one insert pocket, the at least one insert pocket comprises: a pocket base abutment surface; a threaded bore extending tangentially rearwardly from the pocket base abutment surface; pocket side walls extending upwardly from the pocket base abutment surface, two spaced apart of the pocket side walls are a first pocket abutment surface, forming an acute first pocket internal angle with the pocket base abutment surface, and a second pocket abutment surface, forming an acute second pocket internal angle with the pocket base abutment surface.

In one embodiment, the cutting tool's cutting insert comprises: two opposing end surfaces and a peripheral surface extending therebetween, each end surface having a mutual first axis of symmetry passing through the end surfaces about which each end surface has N-fold rotational symmetry, where N is a number from the group consisting of 2, 3 and 4; a peripheral cutting edge formed at the junction between each end surface and the peripheral surface, the peripheral cutting edge comprising N curved cutting edges (32, 34; 132, 134) merging with N straight cutting edges which extend between the curved cutting edges at extremities thereof; wherein the curved cutting edges of the two end surfaces are not aligned, as seen in an end view of the cutting insert.

The cutting tool's cutting insert may further comprise: a first, second, third and fourth pairs of side abutment surfaces, each pair of the side abutment surfaces has 180° rotational symmetry around the through bore axis, the first pair of side abutment surfaces converge towards each other in a direction toward the upper surface, the second pair of side abutment surfaces converge towards each other in a direction toward the lower surface, the third pair of side abutment surfaces converge towards each other in a direction toward the upper surface, the fourth pair of side abutment surfaces converge towards each other in a direction toward the lower surface, the third pair has 180° rotational symmetry with the fourth pair around a second symmetry axis that passes between the third pair and the fourth pair, the upper surface defines a first reference plane and the lower surface defines a second reference plane, the first and second reference planes are parallel to a median plane that is located midway between the upper surface and the lower surface, the peripheral surface forms with the first reference plane and with the second reference plane an obtuse first internal included angle, as seen in a first side view of the cutting insert that is perpendicular to a given secondary cutting edge, the peripheral surface forms with the first reference plane and with the second reference plane an acute second internal included angle, as seen in a second side view of the cutting insert that is perpendicular to the first side view, the upper surface is provided with a planar upper central abutment surface, constituting an insert upper base abutment surface, that extends inwardly from an associated rake surface toward the through bore; the lower surface is provided with a planar lower central abutment surface, constituting an insert lower base abutment surface, that extends inwardly from the associated rake surface toward the through bore; wherein: in a retained position of the cutting insert, the insert lower base abutment surface abuts the pocket base abutment surface, one abutment surface of the insert first pair of side abutment surfaces abuts the first pocket abutment surface, one abutment surface of the insert third pair of side abutment surfaces abuts the second pocket abutment surface, and, a clamping screw passes through the through bore of the cutting insert and threadingly engages the threaded bore of the insert pocket.

In one embodiment, each side abutment surface of the first pair of side abutment surfaces converges towards each other in a direction toward the upper surface; each side abutment surface of the second pair of side abutment surfaces converges towards each other in a direction toward the lower surface; each side abutment surface of the third pair of side abutment surfaces converges towards each other in a direction toward the upper surface; and each side abutment surface of the fourth pair of side abutment surfaces converges towards each other in a direction toward the lower surface.

If desired, the third pair of side abutment surfaces has 180° rotational symmetry with the fourth pair of side abutment surfaces around the symmetry axis.

Further if desired, the first pair of side abutment surfaces converge towards each other in a direction toward the upper surface as viewed in a cross-section taken in a first section plane, the first section plane contains the through bore axis and is obliquely disposed, as seen in an end view of the cutting insert, with respect to a symmetry plane containing the through bore axis and the symmetry axis.

Still further if desired, the second pair of side abutment surfaces converge towards each other in a direction toward the lower surface as viewed in a cross-section taken in a second section plane, the second section plane contains the through bore axis and is obliquely disposed at a plane angle, as seen in a top view of the cutting insert, with respect to the symmetry plane and with respect to the first section plane.

In one embodiment, the plane angle is 80°.

Typically, the peripheral surface forms with the first reference plane and with the second reference plane an obtuse first internal included angle, as seen in a first side view of the cutting insert that is perpendicular to a secondary cutting edge; and the peripheral surface forms with the first reference plane and with the second reference plane an acute second internal included angle, as seen in a second side view of the cutting insert that is perpendicular to the first side view.

If desired, the first main cutting edge and the second main cutting edge follow a major first radius of curvature along the major portion thereof and a minor second radius of curvature along a minor portion thereof.

Typically, the at least one insert pocket is provided with a pocket abutment relief surface that is located above the second pocket abutment surface, the pocket abutment relief surface being relieved from the adjacent abutment surface of the insert fourth pair of side abutment surfaces in a retained position of the cutting insert.

In one embodiment, the cutting insert is four times indexable within the at least one insert pocket.

Typically, the first pocket abutment surface forms with the second pocket abutment surface an acute pocket angle as seen in a top view of the at least one insert pocket.

If desired, the at least one insert pocket is provided with a pocket relief channel located between the pocket side walls and the pocket base abutment surface.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
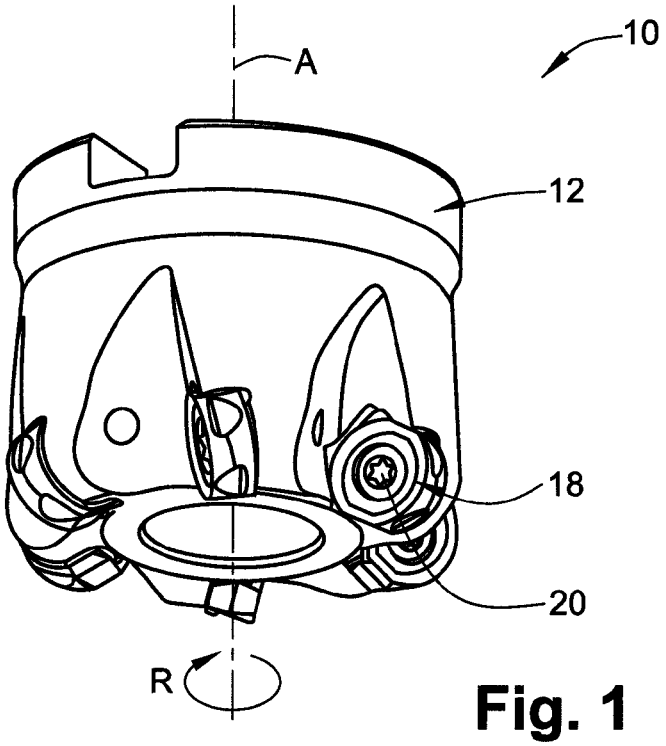
FIG. 1 is a perspective view of a cutting tool in accordance with the present invention.
Figure 2:
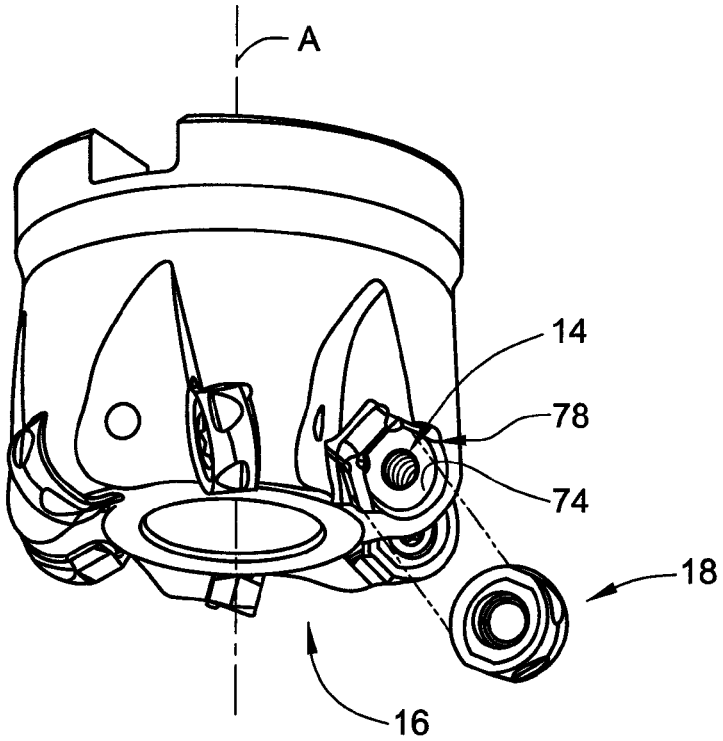
FIG. 2 is shows the cutting tool of FIG. 1 with a cutting insert in accordance with the present invention removed from its pocket.

Attention is first drawn to FIGS. 1 and 2 showing a cutting tool 10 in accordance with the present invention. The cutting tool 10 has a longitudinal axis of rotation A defining a front-to-rear direction of the cutting tool 10 and a direction of rotation R. The cutting tool 10 comprises a tool body 12 having a plurality of insert pockets 14 formed in a front end 16 of the tool body 12. A cutting insert 18 is retained in each of the insert pockets 14 by means of a clamping screw 20. The cutting insert 18 may be preferably made from cemented carbide powders by pressing and sintering or by injection molding techniques.

Attention is now drawn to FIGS. 3 to 10. The cutting insert 18 comprises an upper surface 22, defining a first reference plane P1, a lower surface 24, defining a second reference plane P2, and a peripheral surface 26 extending between the upper surface 22 and the lower surface 24. The upper surface 22 and the lower surface 24 constitute end surfaces 28 of the cutting insert 18. In some embodiments, the end surfaces 28 may be identical, and the first reference plane P1 may be parallel to the second reference plane P2.

The cutting insert 18 is provided with a through bore 30 having a through bore axis B. The through bore 30 extends between the upper surface 22 and the lower surface 24. In some embodiments, the cutting insert 18 may have 180° rotational symmetry around the through bore axis B.

In some embodiments, each of the end surfaces 28 may comprise a first main cutting edge 32 and a second main cutting edge 34. The first main cutting edge 32 and the second main cutting edge 34 may be identical. The cutting edges are formed at the junction between each end surface 28 and the peripheral surface 26.

Figure 5:
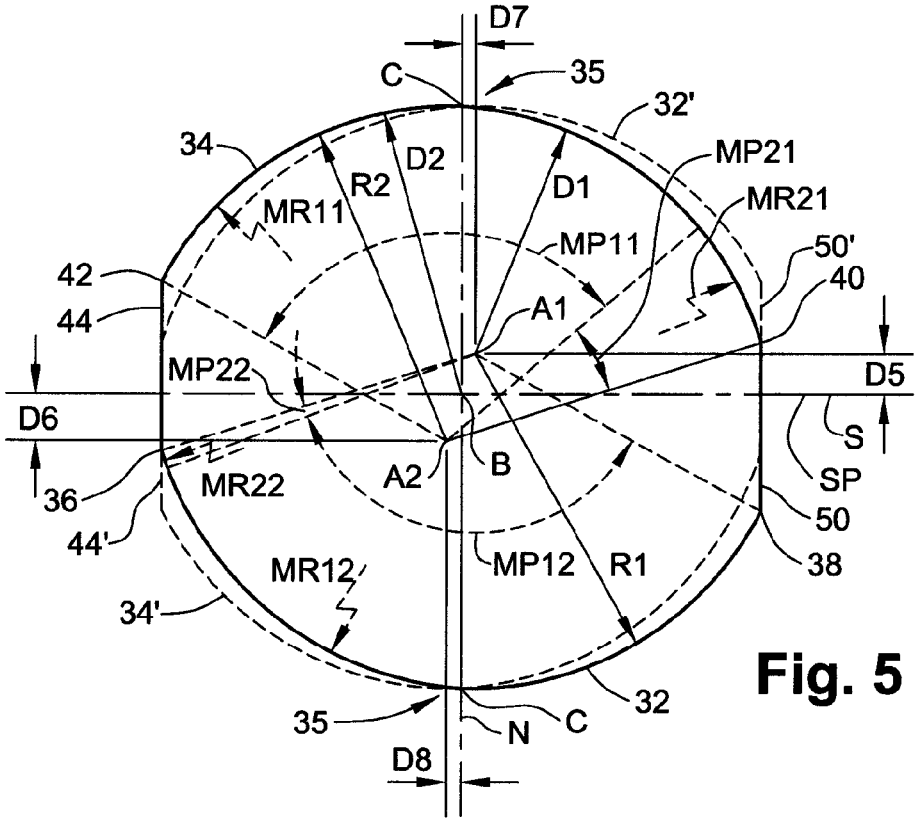
FIG. 5 is an end view of the cutting insert of FIG. 3 showing the cutting edges of both end surfaces without showing the through bore.

FIG. 5 is an end view of the cutting insert 18 showing the cutting edges of both end surfaces without showing the through bore 30. The cutting edges of the upper surface 22 are shown in solid lines and the cutting edges of the lower surface 24 are shown in dashed lines. As can be seen, the first and second main cutting edges 32, 34 of the upper surface 22 are angularly shifted with respect to the first and second main cutting edges 32', 34' of the lower surface 24. Thus, as seen in an end view of the cutting insert 18, the main cutting edges of a given end surface 28 are not aligned with the main cutting edges of the opposite end surface 28.

For sake of clarity, the non-alignment of the main cutting edges may be described in the following manner. Each of the cutting edges 32, 34 has a cutting edge pivot axis C associated therewith. The cutting edge pivot axis C is located in a mid portion 35 of the cutting edge and extends parallel to an axis of symmetry S which will be later described. The mid portion 35 refers to a region including the geometrical center of the curved cutting edge and not necessarily to the actual geometrical center of the curved cutting edge.

Thus, as can be seen in FIG. 5, each of the curved cutting edges 32, 34 of one end surface 28 is rotated about its associated cutting edge pivot axis C relative to the opposite curved cutting edge 34', 32' of the other end surface 28. Thus, though the curved cutting edges 32, 34 intersect cutting edges 34', 32', respectively, when viewed along axis B, they clearly are not aligned.

In an end view of the cutting insert 18, the first main cutting edge 32 has a first radius of curvature R1 with respect to a first cutting edge axis A1, and, the second main cutting edge 34 has a second radius of curvature R2 with respect to a second cutting edge axis A2. As shown in FIG. 5, the first cutting edge axis A1 and the second cutting edge axis A2 may be parallel to the through bore axis B and located at opposite sides thereof. As shown, the first cutting edge axis A1 is located a first distance D1 from the second main cutting edge 34, the through bore axis B is located a second distance D2 from the second main cutting edge 34, and the first distance D1 is smaller than the second distance D2.

Hence, as seen in an end view of the cutting insert 18, the first cutting edge axis A1 is located closer to the second main cutting edge 34 than the through bore axis B. In a similar manner, the second cutting edge axis A2 is located closer to the first main cutting edge 32 than the through bore axis B.

The first main cutting edge 32 and the second main cutting edge 34 do not have to follow a radius of curvature, and they may be curved in other forms. For example, in one embodiment that is shown in dashed lines in the upper portion of FIG. 5, the first main cutting edge 32 and the second main cutting edge 34 may follow a major first radius of curvature MR11 along a major angular portion MP11 thereof and a minor second radius of curvature MR21 along a minor angular portion MP21 thereof.

In that embodiment, the major first radius of curvature MR11 may be different than the minor second radius of curvature MR21. Furthermore, the major first radius of curvature MR11 may extend along a relatively large angle, represented by the major portion MP11, for example, 120°, wherein the minor second radius of curvature MR21 may extend along a smaller angle, represented by the minor portion MP21, for example, 20°. This embodiment is shown with respect to only one main cutting edge, in this case, with respect to the second main cutting edge. However, the embodiment may be equally applicable to the first and second main cutting edges.

In another embodiment that is shown in dashed lines in the lower portion of FIG. 5, the major first radius of curvature MR12 may extend along a relatively large angular portion MP12, for example, 140°, wherein the minor second radius of curvature MR22 may extend along a much smaller angular portion MP22, for example, 1° to 10°. This embodiment is shown with respect to only one main cutting edge, in this case, with respect to the first main cutting edge. However, the embodiment may be equally applicable to the first and second main cutting edges.

In other embodiments, the first main cutting edge 32 and the second main cutting edge 34 are formed from several sections (not shown in the figures) that have different radii of curvature and merge with each other to form a continuously curved main cutting edge.

The first main cutting edge 32 has a leading end 36 and a trailing end 38. The second main cutting edge 34 has a leading end 40 and a trailing end 42. A first secondary cutting edge 44 merges, at a leading end 46 thereof, with the leading end 36 of the first main cutting edge 32, and, at a trailing end 48 thereof, with the trailing end 42 of the second main cutting edge 34.

A second secondary cutting edge 50 merges, at a leading end 52 thereof, with the leading end 40 of the second main cutting edge 34, and, at a trailing end 54 thereof, with the trailing end 38 of the first main cutting edge 32.

In one embodiment, the first secondary cutting edge 44 is identical to the second secondary cutting edge 50. The first and second secondary cutting edges 44, 50 are mainly used for performing ramp-down operations and their length and shape are determined according to machining needs. In one embodiment, the first secondary cutting edge 44 and the second secondary cutting edge 50 are formed along straight lines.

As can be seen in FIG. 5, in addition to the fact that the first and second main cutting edges 32, 34 of the upper surface 22 are angularly shifted with respect to the respective second and first main cutting edges 34', 32' of the lower surface 24, the first and second secondary cutting edges 44, 50 of the upper surface 22 are linearly shifted with respect to the first and second secondary cutting edges 44', 50' of the lower surface 24.

Figure 7:
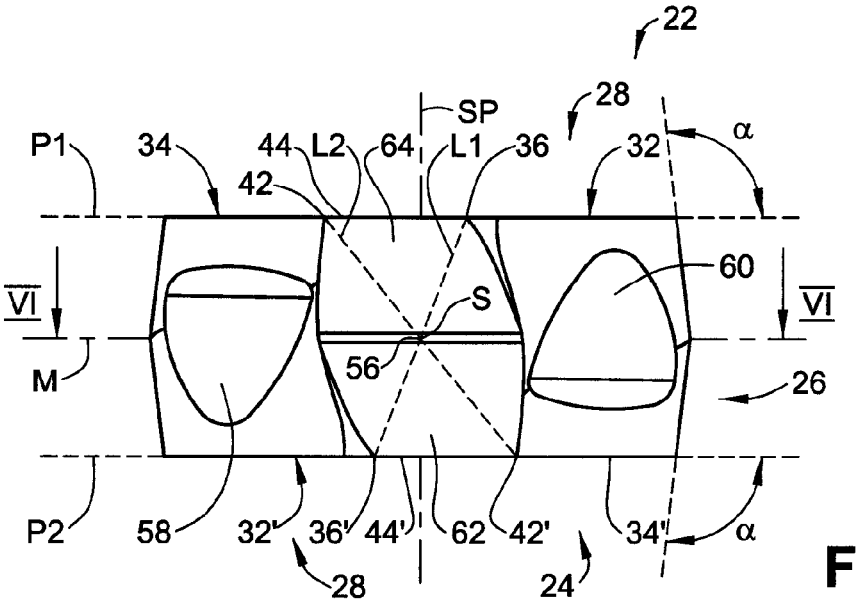
FIG. 7 is a first side view of the cutting insert of FIG. 3.

The cutting insert 18 may have 180° rotational symmetry around a symmetry axis S. The symmetry axis S lies on a median plane M between the first and second reference planes P1, P2, and intersects the peripheral surface 26 at two median insert symmetry points 56. Each of the median insert symmetry points 56 is formed at the intersection of a first reference line L1 with a second reference line L2, as seen in FIG. 7. FIG. 7 being a first side view of the cutting insert 18 that is perpendicular to the first or the second secondary cutting edges 44, 50.

In the embodiment described above, the main cutting edges 32, 34 are identical to each other, the secondary cutting edges 44, 50 are identical to each other, and both end surfaces 28, namely, the upper surface 22 and the lower surface 24 are identical to each other. Therefore, for numbering the cutting edges of the lower surface 24, an arbitrary decision was made to rotate the cutting insert 18 180° around the symmetry axis S. In this position, the cutting edges which were previously located in the upper surface 22 are now located in the lower surface 24 and a prime sign was added to their number. Thus, for example, the corresponding cutting edge of the first main cutting edge 32 is marked 32', and so on.

The first reference line L1 connects the leading end 36 of a first main cutting edge 32 of a given end surface 28 with the leading end 36' of a first main cutting edge 32' of the opposite end surface 28. The second reference line L2 connects the trailing end 42 of a second main cutting edge 34 of a given end surface 28 with the trailing end 42' of a second main cutting edge 34' of the opposite end surface 28.

The peripheral surface 26 comprises a first pair of side abutment surfaces 58, a second pair of side abutment surfaces 60, a third pair of side abutment surfaces 62 and a fourth pair of side abutment surfaces 64. In one embodiment, each pair of the side abutment surfaces 58, 60, 62, 64 has 180° rotational symmetry around the through bore axis B.

Figure 9:
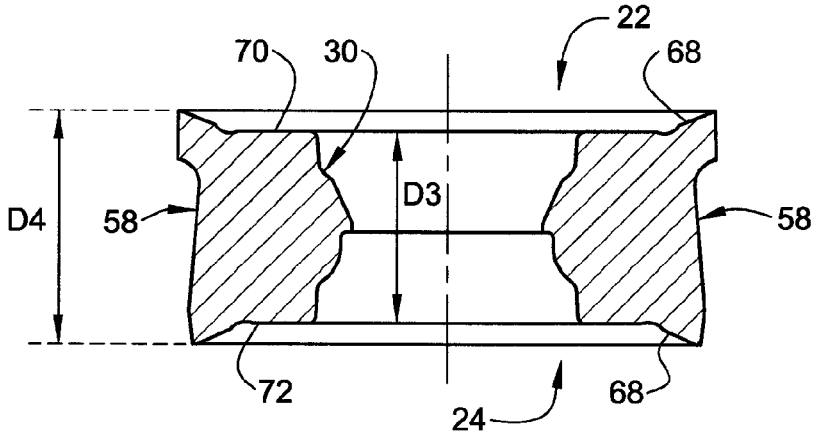
FIG. 9 is a cross-sectional view of the cutting insert of FIG. 3 taken along line IX-IX in FIG. 4.

As seen in FIG. 9, each side abutment surface of the first pair of side abutment surfaces 58 converges towards each other in a direction toward the upper surface 22. FIG. 9 is a view of a cross-section taken in a first section plane P3. As seen in the end view of FIG. 4, the first section plane P3 contains the through bore axis B and is obliquely disposed with respect to a symmetry plane SP containing the through bore axis B and the symmetry axis S.

Figure 4:
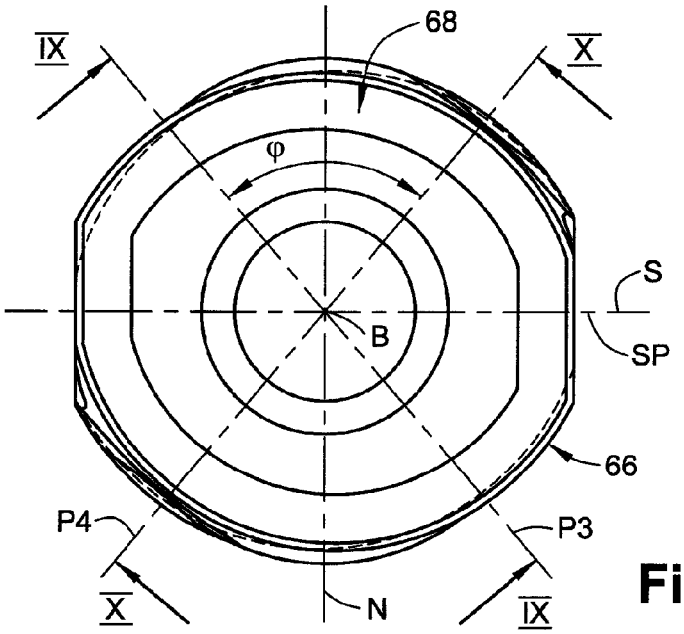
FIG. 4 is an end view of the cutting insert of FIG. 3.
Figure 10:
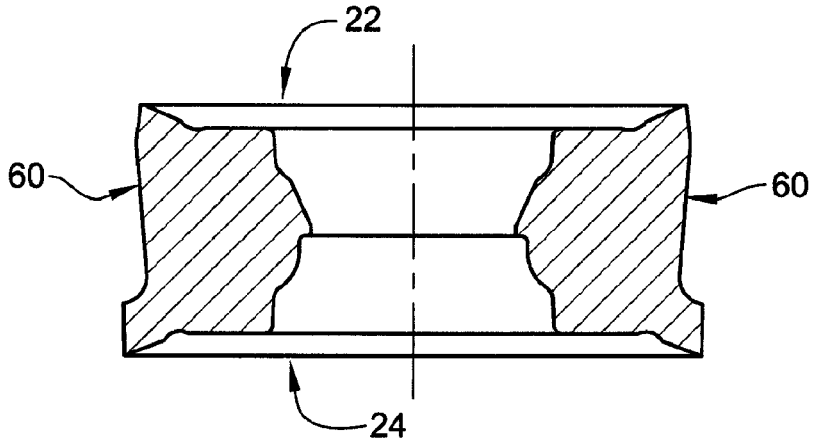
FIG. 10 is a cross-sectional view of the cutting insert of FIG. 3 taken along line X-X in FIG. 4.

As seen in FIG. 10, each side abutment surface of the second pair of side abutment surfaces 60 converges towards each other in a direction toward the lower surface 24. FIG. 10 is a view of a cross-section taken in a second section plane P4. The second section plane P4 contains the through bore axis B and is obliquely disposed, as seen in FIG. 4, with respect to the symmetry plane SP and with respect to the first section plane P3. In one embodiment, the first section plane P3 forms with the second section plane P4 a plane angle $\phi$ of 80°, with a supplementary angle of 100°.

Figure 6:
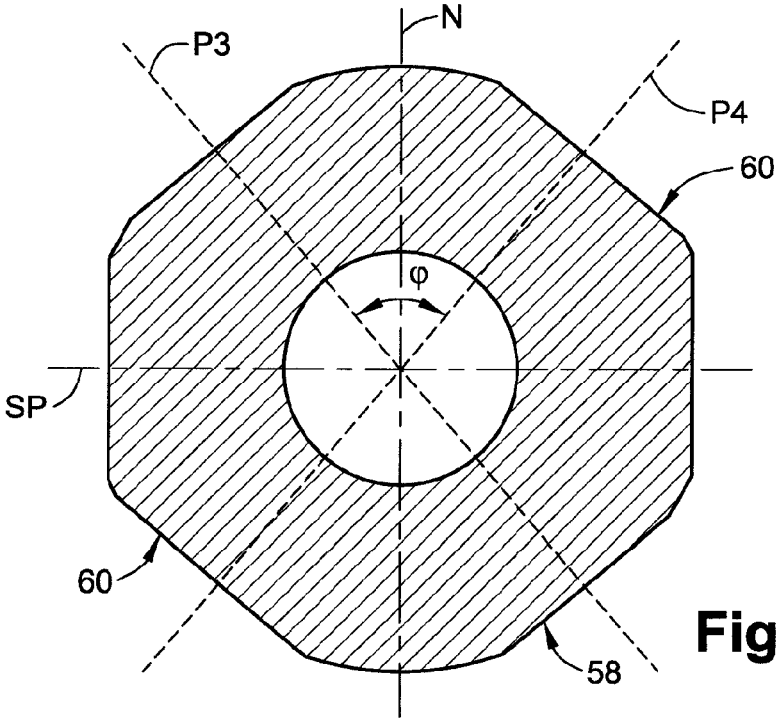
FIG. 6 is a cross-sectional view of the cutting insert of FIG. 3 taken along line VI-VI in FIG. 7.

The plane angle $\phi$ between the first section plane P3 and the second section plane P4 may be seen also in FIG. 6, where the first section plane P3 is perpendicular to the first pair of side abutment surfaces 58 and the second section plane P4 is perpendicular to the second pair of side abutment surfaces 60. Both first section plane P3 and second section plane P4 are perpendicular to the median plane M, which also contains the symmetry axis S.

Figure 8:
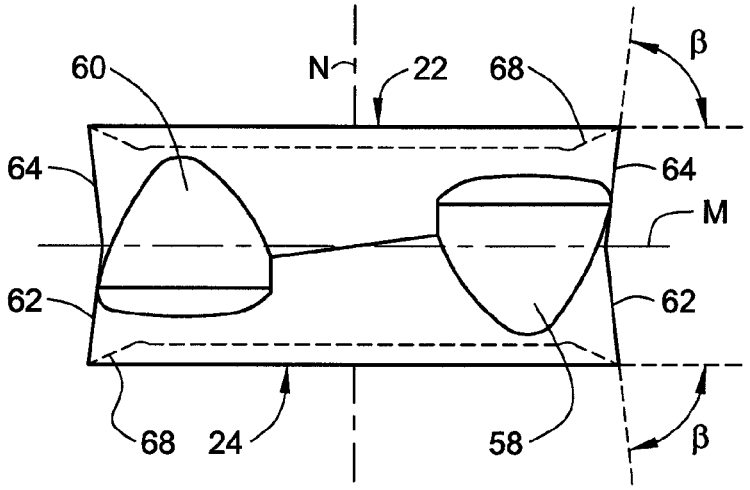
FIG. 8 is a second side view of the cutting insert of FIG. 3.

As seen in FIG. 8, each side abutment surface of the third pair of side abutment surfaces 62 converges towards each other in a direction toward the median plane M. Similarly, each side abutment surface of the fourth pair of side abutment surfaces 64 also converges towards each other in a direction toward the median plane M. One may likewise consider the third pair of side abutment surfaces 62 to converge towards each other in a direction toward the upper surface 22, and the fourth pair of side abutment surfaces 64 to converge towards each other in a direction toward the lower surface 24.

In one embodiment, the third pair of side abutment surfaces 62 has 180° rotational symmetry with the fourth pair of side abutment surfaces 64 around the symmetry axis S.

As seen in FIG. 7, the peripheral surface 26 forms with the first reference plane P1 and with the second reference plane P2 an obtuse first internal included angle $\alpha$. FIG. 7, being a first side view of the cutting insert 18, is viewed from a direction perpendicular to a secondary cutting edge 44.

FIG. 8 is a second side view of the cutting insert 18 taken in a direction perpendicular to the symmetry plane SP. The direction perpendicular to the symmetry plane SP is represented by an imaginary plane N. Hence, the direction of the second side view of the cutting insert 18 is perpendicular to the direction of the first side view of the cutting insert 18. As seen in FIG. 8, the peripheral surface 26 forms with the first reference plane P1 and with the second reference plane P2 an acute second internal included angle $\beta$.

As can be seen in FIG. 5, the first cutting edge axis A1 and the second cutting edge axis A2 are located at opposite sides of the symmetry plane SP. The first cutting edge axis A1 is distanced a first axis distance D5 from the symmetry plane SP and the second cutting edge axis A2 is distanced a second axis distance D6 from the symmetry plane SP. According to one embodiment, the first axis distance D5 is equal to the second axis distance D6.

In one embodiment, as can be seen in FIG. 5, the first cutting edge axis A1 and the second cutting edge axis A2 may be located at opposite sides of the imaginary plane N. In that case, the first cutting edge axis A1 is distanced a third axis distance D7 from the imaginary plane N and the second cutting edge axis A2 is distanced a fourth axis distance D8 from the imaginary plane N. According to one embodiment, the third axis distance D7 is equal to the fourth axis distance D8.

Figure 3:
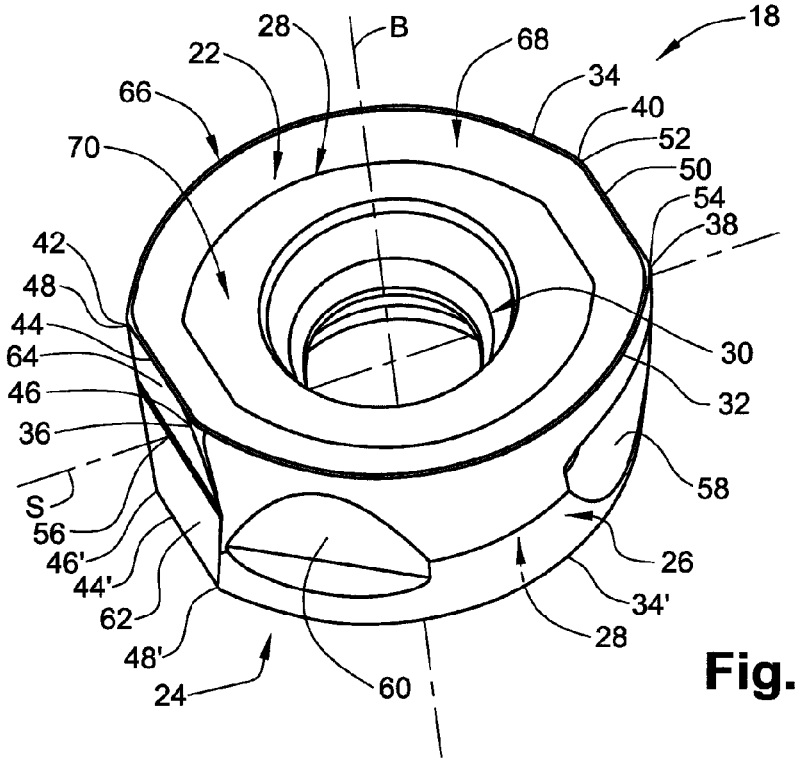
FIG. 3 is an enlarged perspective view of the cutting insert of FIG. 2.

As can be best seen in FIGS. 3 and 4, the first and second main cutting edges 32, 34 of a given end surface 28 and their associated first and second secondary cutting edges 44, 50 form a continuously extending cutting edge 66 that is associated with a rake surface 68. In one embodiment, the rake surface 68 extends continuously along the entire length of the cutting edge 66. The rake surface 68 extends inwardly from the cutting edge 66 toward the through bore axis B, and slopes rearwardly toward the median plane M in the direction of the other end surface 28.

The upper surface 22 of the cutting insert 18 is provided with a planar upper central abutment surface 70 that extends inwardly from the associated rake surface 68 toward the through bore 30. Similarly, the lower surface 24 is provided with a planar lower central abutment surface 72 that extends inwardly from the associated rake surface 68 toward the through bore 30.

As seen in FIG. 9, the upper central abutment surface 70 is distanced a third distance D3 from the lower central abutment surface 72, the first reference plane P1 is distanced a fourth distance D4 from the second reference plane P2, and, the third distance D3 is smaller than the fourth distance D4. Thus, the central abutment surfaces 70, 72 are recessed toward the median plane M, relative to their respective associated reference planes P1, P2.

Figure 11:
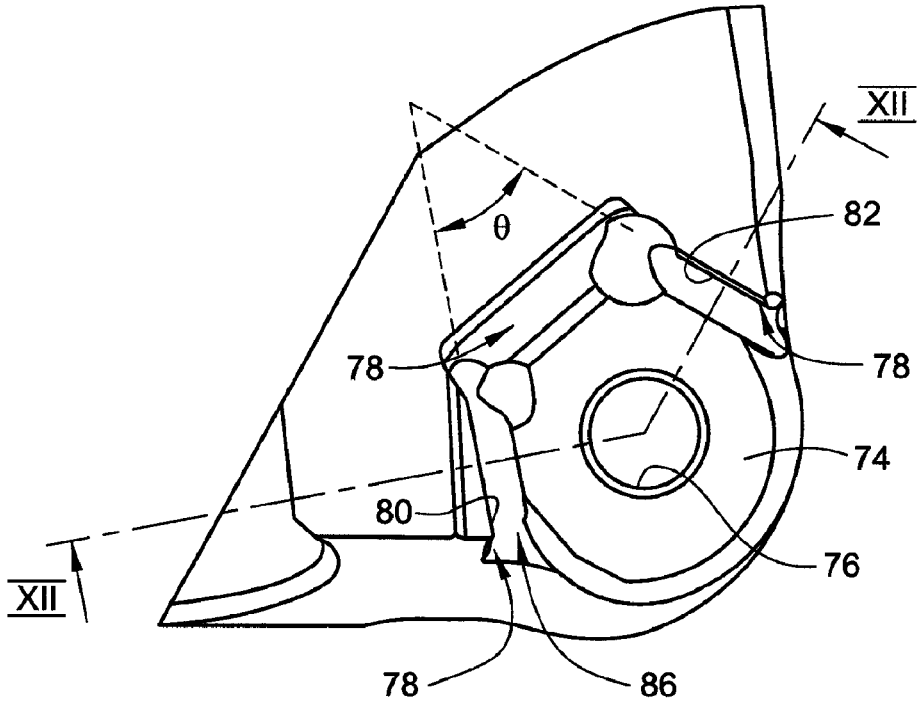
FIG. 11 is a top view of the insert pocket of FIG. 2.
Figure 12:
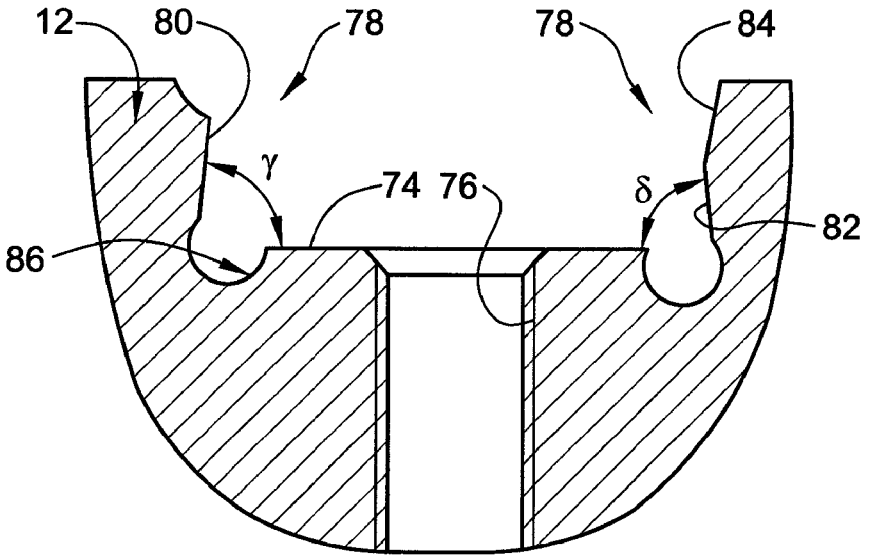
FIG. 12 is a cross-sectional view of the insert pocket taken along line XII-XII in FIG. 11.
Figure 13:
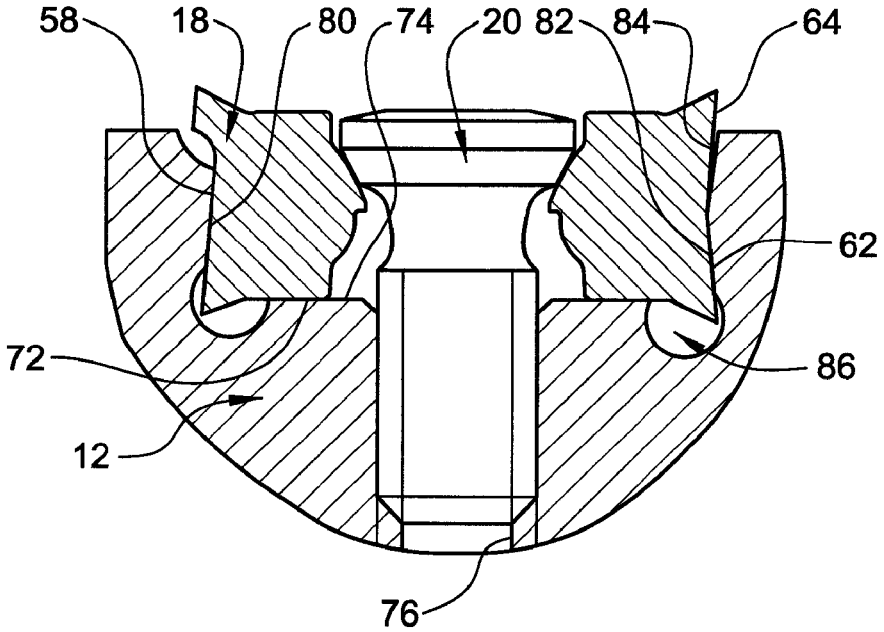
FIG. 13 is a cross-sectional view of the insert pocket taken along line XII-XII in FIG. 11 with the cutting insert retained in the insert pocket by a clamping screw.

Attention is now drawn to FIGS. 11 to 14. Each insert pocket 14 comprises a pocket base abutment surface 74. The pocket base abutment surface 74 may be planar, and it may be formed as a single surface, as shown in FIG. 11, or be divided into several surfaces. If the pocket base abutment surface is divided into several surfaces, the several surfaces may be separated by relief grooves. A threaded bore 76 extends tangentially rearwardly from the pocket base abutment surface 74.

The insert pocket 14 further comprises pocket side walls 78 that extend upwardly from the pocket base abutment surface 74. Two of the pocket side walls 78 form pocket abutment surfaces. In one embodiment, the pocket abutment surfaces are spaced apart by a pocket side wall 78 that does not form a pocket abutment surface.

The pocket abutment surfaces comprise a first pocket abutment surface 80 and a second pocket abutment surface 82. The first pocket abutment surface 80 forms an acute first pocket internal angle $\gamma$ with the pocket base abutment surface 74, and the second pocket abutment surface 82 forms an acute second pocket internal angle $\delta$ with the pocket base abutment surface 74.

In a retained position of the cutting insert 18, the insert lower central abutment surface 72 abuts the pocket base abutment surface 74, one abutment surface of the insert first pair of side abutment surfaces 58 abuts the first pocket abutment surface 80, one abutment surface of the insert third pair of side abutment surfaces 62 abuts the second pocket abutment surface 82, and, the clamping screw 20 passes through the through bore 30 of the cutting insert 18 and threadingly engages the threaded bore 76 of the insert pocket 14.

By means of the acute internal angles $\gamma$ and $\delta$, the seating of the insert first 58 and third 62 operative side abutment surfaces against the first and second pocket abutment surfaces 80, 82 provides a firm clamping of the cutting insert 18 in a dove-tail manner thus better securing the cutting insert 18 within the insert pocket 14.

The insert pocket 14 is provided with a pocket abutment relief surface 84 that is located above the second pocket abutment surface 82 and away from the pocket base abutment surface 74. In a retained position of the cutting insert 18, the pocket abutment relief surface 84 is relieved from the adjacent abutment surface of the insert fourth pair of side abutment surfaces 64.

The insert pocket 14 is further provided with a pocket relief channel 86. The pocket relief channel 86 is located between the pocket side walls 78 and the pocket base abutment surface 74. When the cutting insert 18 is retained within the insert pocket 14, the pocket relief channel 86 provides adequate clearance to the cutting edge 66 associated with the lower central abutment surface 72 of the cutting insert 18 that abuts the pocket base abutment surface 74.

As can be best seen in FIG. 11, the first pocket abutment surface 80 forms with the second pocket abutment surface 82 an acute pocket angle θ in order to adequately support the side abutment surfaces of the cutting insert 18.

Figure 14:
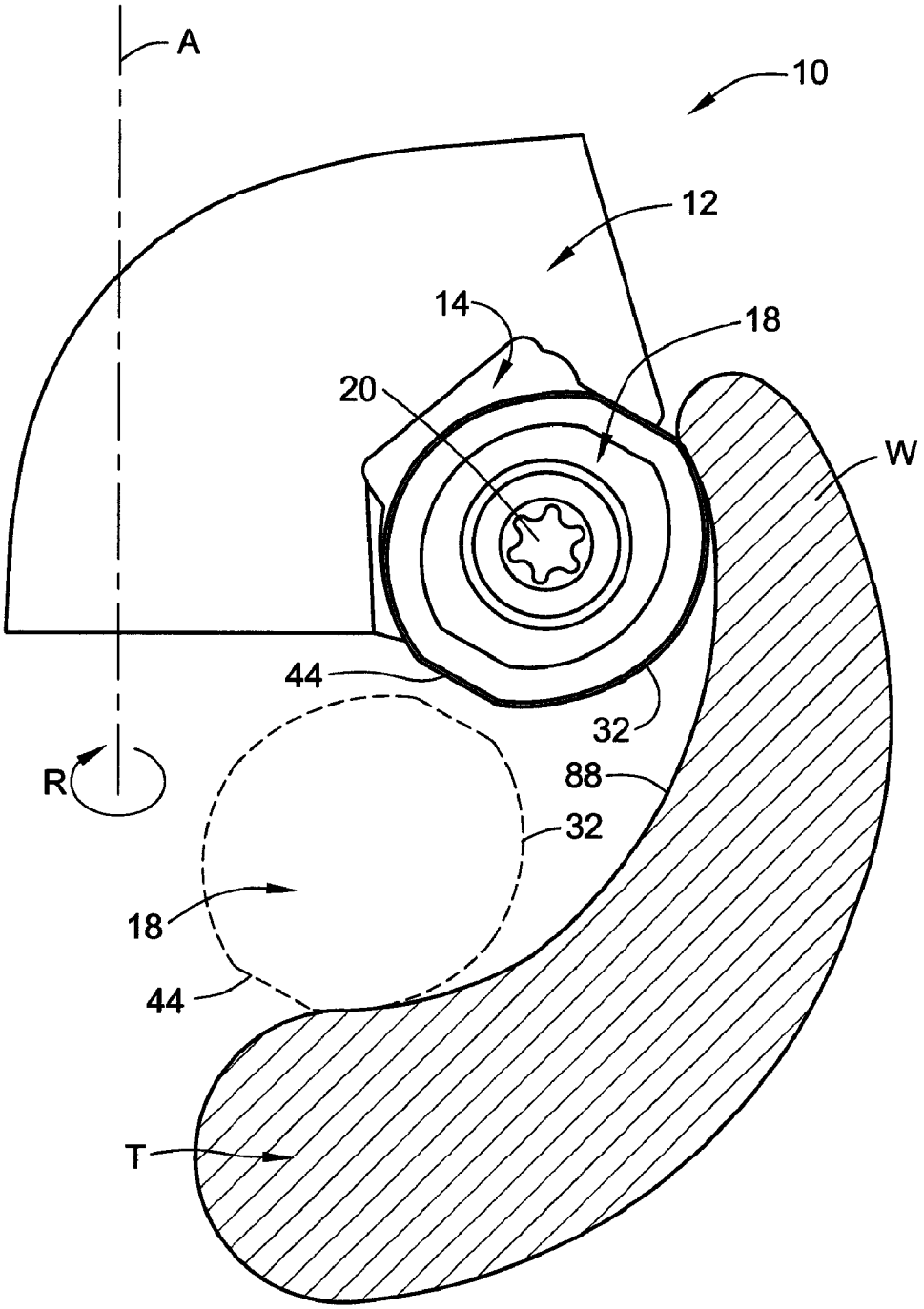
FIG. 14 is a top view of the cutting insert mounted in the insert pocket and machining a workpiece.
Figure 15:
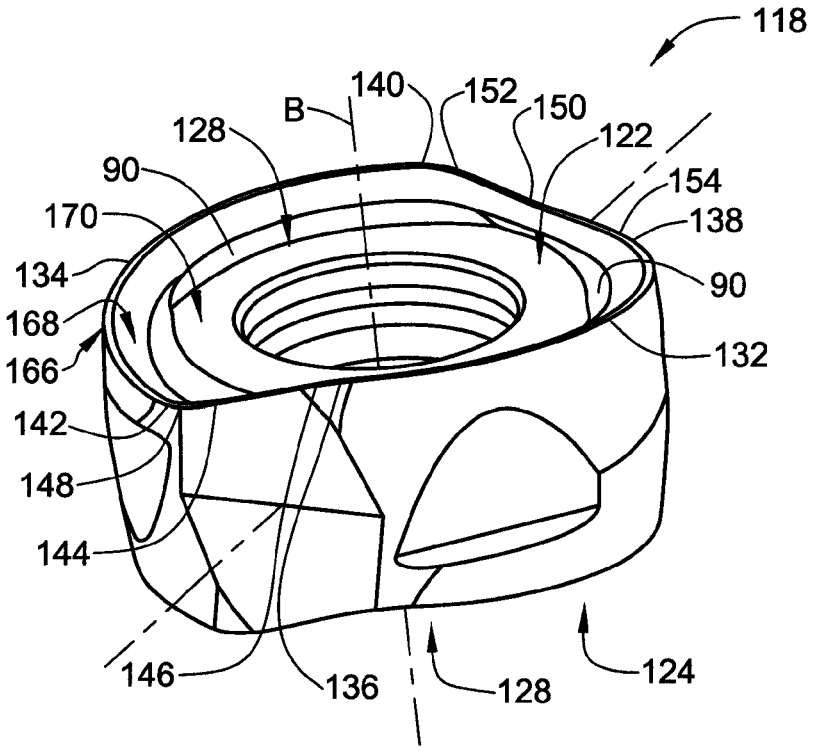
FIG. 15 is a perspective view of another embodiment of the cutting insert in accordance with the present invention.
Figure 16:
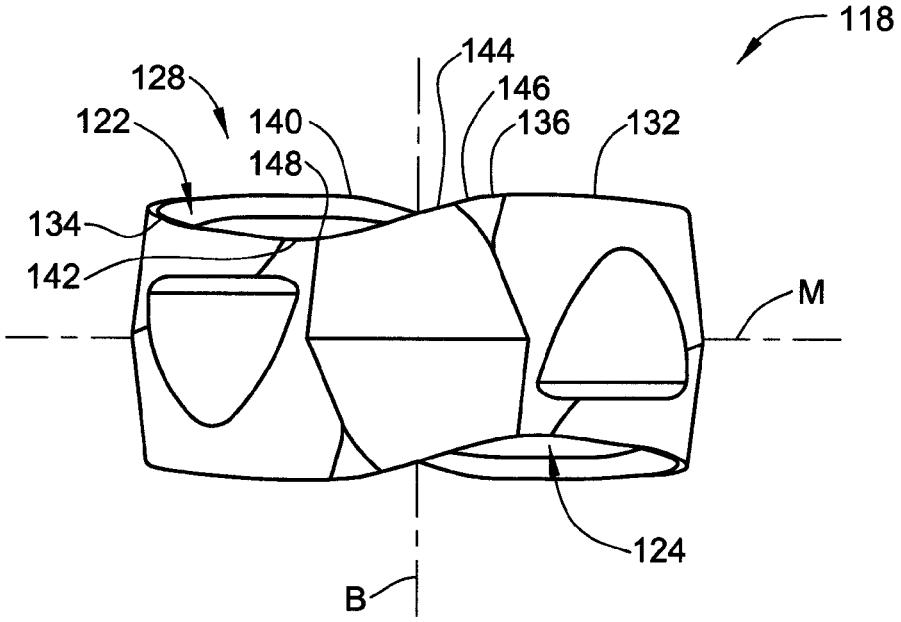
FIG. 16 is a first side view of the cutting insert of FIG. 15.
Figure 17:
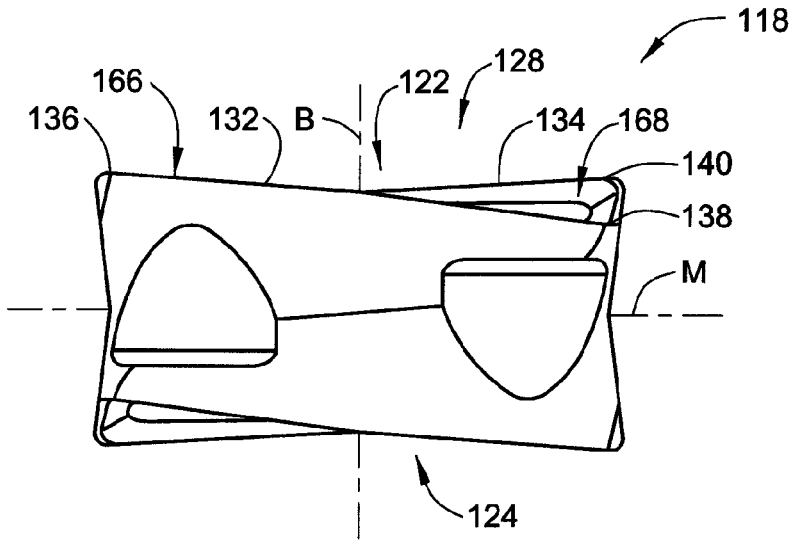
FIG. 17 is a second side view of the cutting insert of FIG. 15.
Figure 18:
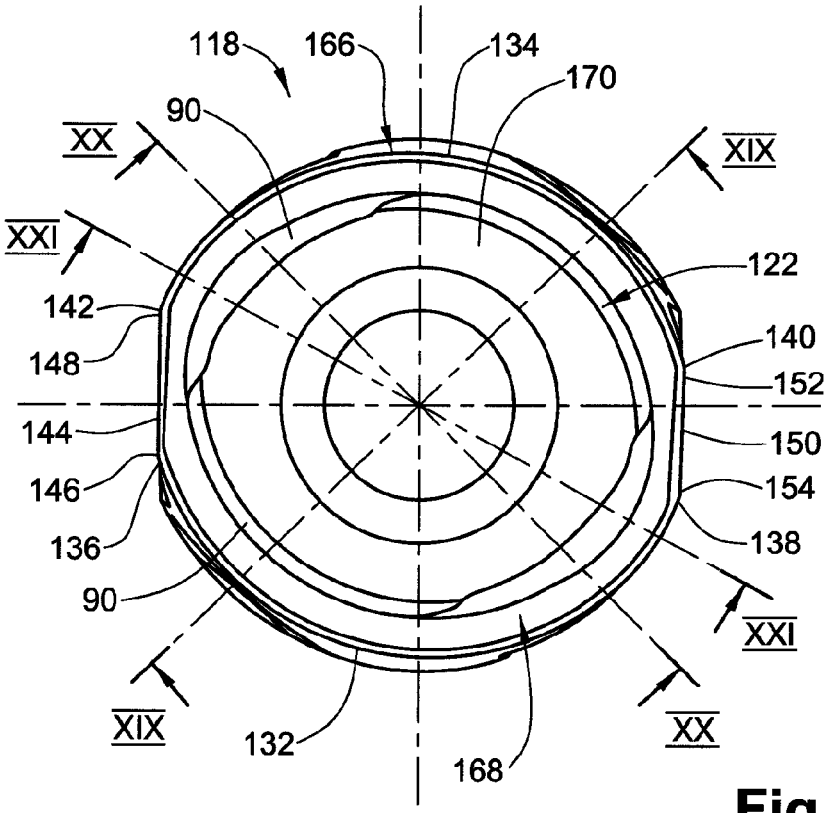
FIG. 18 is a top view of the cutting insert of FIG. 15.

FIG. 14 shows a top view of the cutting insert 18 when retained within an insert pocket 14 and machining a workpiece W. For sake of clarity, only a part of the tool body 12 is shown. As shown, the active main cutting edge 32 that may be round along a relatively large arc enables the cutting tool 10 to effectively machine, for example, internal profiles of turbine blades T along the entire internal surface 88 of the blade T.

The cutting insert 18 drawn in solid lines shows the location of the cutting insert when beginning to machine the internal surface 88 of the turbine blade T. The cutting insert 18 drawn in dashed lines shows the location of the cutting insert when ending the machining of the internal surface 88 of the turbine blade T.

As can be seen by the two extreme positions of the cutting insert 18 with respect to the internal surface 88 of the turbine blade T, the entire active main cutting edge 32 is operative during this machining process. Since the main cutting edge 32 extends along a relatively large arc, it is effective for machining an entire concave internal surface 88 of a turbine blade T.

In other applications (not shown), the active secondary cutting edge 44 may effectively perform ramp-down operations.

Hence, as described above, according to one embodiment of the present invention, the cutting insert 18 is capable of performing a variety of cutting operations, and may be four times indexable within an insert pocket 14.

Attention is now drawn to FIGS. 15 to 21 which show another embodiment of the cutting insert. In these figures, like parts are designated with like reference numerals with the addition of 100. The cutting insert 118 shown in FIGS. 15 to 21 has a structure similar to the structure of the cutting insert 18 described above, however, it differs in the shape of its cutting edges.

The cutting insert 118 comprises, in each end surface 128 thereof, first and second main cutting edges 132, 134 that are connected, through extremities thereof, to first and second secondary cutting edges 144, 150.

The first main cutting edge 132 has a leading end 136 and a trailing end 138. The second main cutting edge 134 has a leading end 140 and a trailing end 142. A first secondary cutting edge 144 merges, at a leading end 146 thereof, with the leading end 136 of the first main cutting edge 132, and, at a trailing end 148 thereof, with the trailing end 142 of the second main cutting edge 134.

A second secondary cutting edge 150 merges, at a leading end 152 thereof, with the leading end 140 of the second main cutting edge 134, and, at a trailing end 154 thereof, with the trailing end 138 of the first main cutting edge 132.

In one embodiment, the first secondary cutting edge 144 may be identical to the second secondary cutting edge 150. The first and second secondary cutting edges 144, 150 are mainly used for performing ramp-down operations and their length and shape are determined according to machining needs. In one embodiment, the first main cutting edge 132 may be identical to the second main cutting edge 134.

As can be clearly seen in the figures, the leading end 136 of the first main cutting edge 132 is located further from the median plane M than the trailing end 138 of the first main cutting edge. Similarly, the leading end 140 of the second main cutting edge 134 is located further from the median plane M than the trailing end 142 of the second main cutting edge 134. Such a construction of the first and second main cutting edges 132, 134 provides the cutting insert 118 a highly positive rake with respect to the upper central abutment surface 170.

Each of the first and second main cutting edges 132, 134 lies on a torus. Furthermore, when the cutting insert is retained in the insert pocket 14 of the cutting tool 10, and the cutting tool is rotated about its axis of rotation A by 360°, each point on an operative main cutting edge, i.e., first main cutting edge 132 or second main cutting edge 134, sweeps out a portion of a torus.

Figure 19:
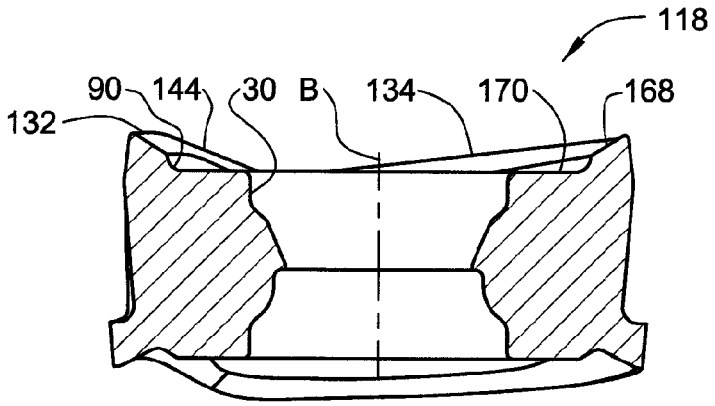
FIG. 19 is a cross-sectional view of the cutting insert of FIG. 15 taken along line XIX-XIX in FIG. 18.
Figure 20:
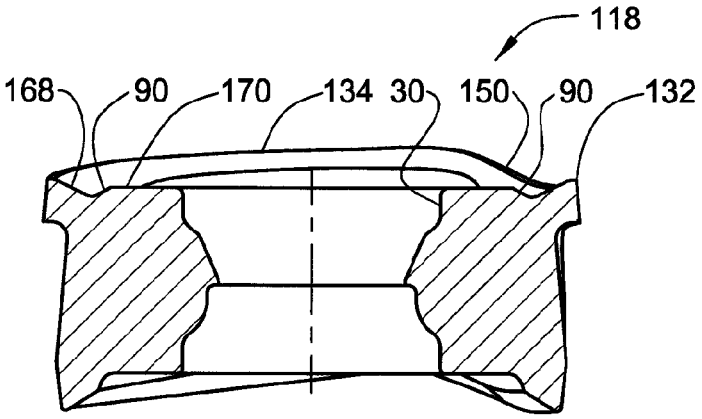
FIG. 20 is a cross-sectional view of the cutting insert of FIG. 15 taken along line XX-XX in FIG. 18.
Figure 21:
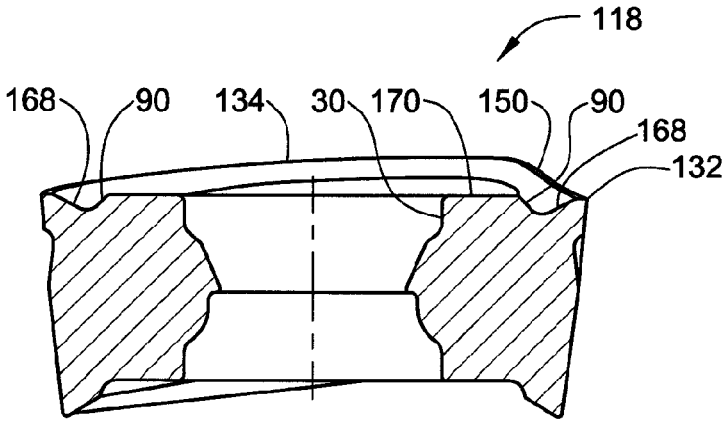
FIG. 21 is a cross-sectional view of the cutting insert of FIG. 15 taken along line XXI-XXI in FIG. 19.

The first and second main cutting edges 132, 134 and their associated first and second secondary cutting edges 144, 150 form a continuously extending cutting edge 166 that is associated with a rake surface 168 that may extend continuously along the entire circumference of an end surface 128. As shown in FIGS. 18 to 21, the rake surface 168 merges with the upper central abutment surface 170 through an undercut 90 which serves two purposes. First, it enables better control of the chips produced during machining. Second, it enables better distinguishing of the upper central abutment surface 170 with respect to the upper surface 122 of the cutting insert 118, thus assuring satisfactory abutment properties of the upper central abutment surface 170. As can be seen in FIGS. 19 to 21, the undercut 90 may vary in size and shape at different cross-sections of the cutting insert 118. Similarly, the same may be applied to the lower surface 124 of the cutting insert 118.

In the embodiments described above, the height orientation of the main cutting edges 132, 134 with respect to the central abutment surface 170 is such that the cutting edges are higher than the central abutment surface, i.e., the central abutment surface 170 is located closer to the median plane M than the main cutting edges 132, 134. However, in other embodiments (not shown) the main cutting edges 132, 134, or at least a portion thereof, may be located closer to the median plane M than the central abutment surface 170.

The construction of the cutting insert 118 enables considerable advantages during machining, as can be appreciated by a person skilled in the art. The highly positive rake of the main cutting edges provides the operative main cutting edge of the cutting insert 118, when the cutting insert 118 is mounted in the cutting tool 10 during machining, with a less negative rake angle, compared to the negative rake angle of the cutting insert 18 shown in FIG. 1 that is mounted in a negative axial positioning. The less negative axial rake leads to easier cutting, better chip removal, lower cutting forces, and, lower power consumption. This construction of the cutting insert 118 may be used when it is required to machine relatively high tensile materials and high temperature alloys. A further advantage in this case may be avoiding adhesion of the chips.

Figure 22:
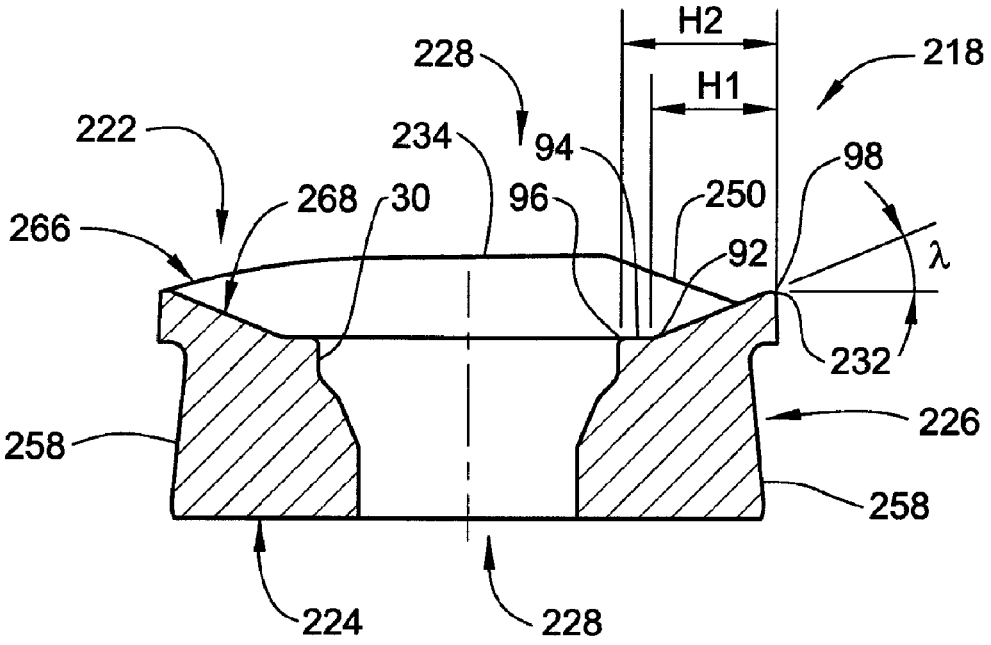
FIG. 22 is a cross-sectional view of another embodiment of the cutting insert.

Attention is now drawn to FIG. 22 which shows another embodiment of the cutting insert. In this figure, like parts are designated with like reference numerals with the addition of 200.

As shown, a cutting insert 218 comprises two end surfaces 228 and a peripheral surface 226 extending therebetween. One of the end surfaces 228 forms an upper surface 222 similar to the upper surface 122 of the cutting insert 118 described above, and, another end surface forms a lower surface 224 of the cutting insert 218. The upper surface 222 comprises a continuously extending peripheral cutting edge 266 associated with a continuously extending rake surface 268.

The peripheral cutting edge 266 comprises two curved cutting edges, namely, a first main cutting edge 232 and a second main cutting edge 234, and, two straight cutting edges, namely, a first secondary cutting edge and a second secondary cutting edge 250 connecting between extremities of the first and second main cutting edges 232, 234 (the first secondary cutting edge is not shown).

In order to better cut ductile materials, the rake surface 268 is formed considerably larger than the rake surface 168 of the cutting insert 118. The rake surface 268 is slanted at a rake slant angle λ with respect to the lower surface 224 of the cutting insert 218. The rake slant angle λ is relatively large and is preferably equal to or greater than 25°.

A rake inner extremity 92 is defined at a region where an innermost extremity of the rake surface 268 merges with a bore peripheral region 94 that surrounds the through bore 30. The bore peripheral region 94 merges with the through bore 30 at a bore upper end 96 and it extends generally parallel to the lower surface 224 of the cutting insert 218. A first rake length H1 is defined between a given point 98 on the peripheral cutting edge 266 and the rake inner extremity 92, measured in a plane parallel to the lower surface 224. A second rake length H2 is defined between the same given point 98 on the peripheral cutting edge 266 and the bore upper end 96, measured in a plane parallel to the lower surface 224.

A rake extension ratio E is defined as a ratio between the first rake length H1 and the second rake length H2. The rake extension ratio E may vary within a preferable range. According to one embodiment, the rake extension ratio E is smaller than b 1 and equal to or greater than 0.8.

Since the rake surface 268 is relatively very large, it extends, in an inward direction of the cutting insert 218, almost to the through bore 30. With such a construction, the upper surface 222 lacks a central abutment surface, in contrary to the existence of the central abutment surface 170 in the upper surface 122 of the cutting insert 118.

Thus, since the cutting insert 218 lacks a central abutment surface, it cannot be used as a double sided cutting insert. Therefore, the lower surface 224 of the cutting insert 118 lacks cutting edges, and is formed flat in order to serve solely as an abutment surface. Accordingly, the peripheral surface 226 is formed only with the abutment surfaces required for abutment of a single sided cutting insert, namely, the first pair of side abutment surfaces 258, and, the third pair of side abutment surfaces 262 (not shown).

Although the present invention has been described to a certain degree of particularity, it should be understood that various alterations and modifications could be made without departing from the spirit or scope of the invention as hereinafter claimed.

The cutting insert is not limited to have two main cutting edges on each end surface. In one embodiment (not shown), the cutting insert is provided with three main cutting edges which are connected, at extremities thereof, by three secondary cutting edges. The three main cutting edges may be identical. Likewise, the three secondary cutting edges may be identical.

In one embodiment (not shown), the cutting insert is provided with four main cutting edges which are connected, at extremities thereof, by four secondary cutting edges. The four main cutting edges may be identical. Likewise, the four secondary cutting edges may be identical.

Thus, a cutting insert according to the present invention may be retained by a clamping screw passing through a through bore. The cutting insert may have four, six or eight rounded cutting edges, wherein the cutting insert may be indexed four, six or eight times. The cutting edges may extend along a large arc and may extend at an angle larger than 120°.

What is claimed is:

1. A double-sided cutting insert (18, 118) for retention in a rotating cutting tool having an axis of rotation, the cutting insert comprising:

two opposing end surfaces (28, 128) and a peripheral surface (26) extending therebetween, each end surface having a mutual first axis of symmetry (B) passing through the end surfaces about which each end surface has N-fold rotational symmetry, where N is a number from the group consisting of 2, 3 and 4;

a peripheral cutting edge (66, 166) formed at the junction between each end surface and the peripheral surface, the peripheral cutting edge comprising N curved cutting edges (32, 34; 132, 134) merging with N straight cutting edges (44, 50; 144, 150) which extend between the curved cutting edges at extremities thereof; wherein:

the curved cutting edges of the two end surfaces are not aligned, as seen in an end view of the cutting insert: and each of the N curved cutting edges (32, 34; 132, 134) lies on a torus and extends along an angle equal to or larger than 120°, as seen along the first axis of symmetry (B).

2. The cutting insert (18, 118) according to claim 1, wherein:

N cutting edge pivot axes (C), located in a mid portion (35) of each of the N curved cutting edges, extend parallel to the first axis of symmetry (B), and each of the N curved cutting edges (32, 34; 132, 134) of one of the end surfaces (28, 128) is rotated about its associated cutting edge pivot axis (C) relative to an opposite curved cutting edge (34', 32') of the other end surface, as seen in an end view of the cutting insert.

3. A double-sided cutting insert (18, 118) for retention in a rotating cutting tool having an axis of rotation, the cutting insert comprising:

two opposing end surfaces (28, 128) and a peripheral surface (26) extending therebetween, each end surface having a mutual first axis of symmetry (B) passing through the end surfaces about which each end surface has N-fold rotational symmetry, where N is a number from the group consisting of 2, 3 and 4;

a peripheral cutting edge (66, 166) formed at the junction between each end surface and the peripheral surface, the peripheral cutting edge comprising N curved cutting edges (32, 34; 132, 134) merging with N straight cutting edges (44, 50; 144, 150) which extend between the curved cutting edges at extremities thereof; wherein:

the curved cutting edges of the two end surfaces are not aligned, as seen in an end view of the cutting insert;

the two end surfaces (28, 128) are identical;

a major angular portion (MP11, MP12) of each of the curved cutting edges extends along an angle equal to or larger than 120° as seen in an end view of the cutting insert.

4. The cutting insert (118) according to claim 1, wherein:

one extremity (136, 140) of any given curved cutting edge (132, 134) is located further from a median plane (M) of the cutting insert than the other extremity (138, 142) of the given curved cutting edge, the median plane being located midway between the end surfaces.

5. A double-sided cutting insert (18, 118) for retention in a rotating cutting tool having an axis of rotation, the cutting insert comprising:

two opposing end surfaces (28, 128) and a peripheral surface (26) extending therebetween, each end surface having a mutual first axis of symmetry (B) passing through the end surfaces about which each end surface has N-fold rotational symmetry, where N is a number from the group consisting of 2, 3 and 4;

a peripheral cutting edge (66, 166) formed at the junction between each end surface and the peripheral surface, the peripheral cutting edge comprising N curved cutting edges (32, 34; 132, 134) merging with N straight cutting edges (44, 50; 144, 150) which extend between the curved cutting edges at extremities thereof; wherein:

the curved cutting edges of the two end surfaces are not aligned, as seen in an end view of the cutting insert; and each of the N curved cutting edges (32, 34; 132, 134) extends along an angle equal to or larger than 120°, as seen along the first axis of symmetry (B).

6. The cutting insert (18) according to claim 1, wherein:

the curved cutting edges (32, 34) associated with one of the end surfaces (28) are located in a first reference plane (P1) and the curved cutting edges (32', 34') associated with the other end surface are located in a second reference plane (P2), the first and second reference planes being parallel to each other and located equidistant from and on either side of a median plane (M) of the cutting insert, the median plane being located midway between the end surfaces.

7. The cutting insert (18, 118) according to claim 1, wherein:

the two end surfaces (28, 128) are identical.

8. The cutting insert according to claim 7, wherein:

a major angular portion (MP11, MP12) of each of the curved cutting edges extends along an angle equal to or larger than 120° as seen in an end view of the cutting insert.

9. The cutting insert (18, 118) according to claim 8, wherein:

the first main cutting edge (32, 132) and the second main cutting edge (34, 134) follow a major first radius of curvature (MR11, MR12) along the major angular portion (MP11, MP12) thereof and a minor second radius of curvature (MR21, MR22) along a minor angular portion (MP21, MP22) thereof.

10. A double-sided cutting insert (18, 118) for retention in a rotating cutting tool having an axis of rotation, the cutting insert comprising:

two opposing end surfaces (28, 128) and a peripheral surface (26) extending therebetween, each end surface having a mutual first axis of symmetry (B) passing through the end surfaces about which each end surface has N-fold rotational symmetry, where N is a number from the group consisting of [2, 3 and 4] *2 and 4*;

a peripheral cutting edge (66, 166) formed at the junction between each end surface and the peripheral surface, the peripheral cutting edge comprising N curved cutting edges (32, 34; 132, 134) merging with N straight cutting edges (44, 50; 144, 150) which extend between the curved cutting edges at extremities thereof; wherein:

the curved cutting edges of the two end surfaces are not aligned, as seen in an end view of the cutting insert;

the cutting insert comprises a through bore (30), having a through bore axis (B) constituting the first axis of symmetry, that extends between the two end surfaces (28); and the peripheral surface (26) comprises first (58), second (60), third (62) and fourth (64) pairs of side abutment surfaces, each pair of side abutment surfaces having 180° rotational symmetry around the through bore axis (B).

11. The cutting insert according to claim 10, wherein:

a first end surface of the two opposing end surfaces (28, 128) constituting an upper surface (22, 122) defining a first reference plane (P1), a second end surface of the two opposing end surfaces constituting a lower surface (24, 124) defining a second reference plane (P2) parallel to the first reference plane;

the curved cutting edges comprise a first main cutting edge (32, 132) and a second main cutting edge (34, 134);

in an end view of the cutting insert the first main cutting edge (32, 132) has a first radius of curvature (R1) with respect to a first cutting edge axis (A1) and the second main cutting edge (34, 134) has a second radius of curvature (R2) with respect to a second cutting edge axis (A2), the first cutting edge axis (A1) and the second cutting edge axis (A2) are parallel to the through bore axis (B) and located at opposite sides thereof;

the first cutting edge axis (A1) is located a first distance (D1) from the second main cutting edge (34, 134), the through bore axis (B) is located a second distance (D2) from the second main cutting edge (34, 134), and the first distance (D1) is smaller than the second distance (D2).

12. The cutting insert (18, 118) according to claim 11, wherein:

the cutting insert has 180° rotational symmetry around a second symmetry axis (S), the second symmetry axis lies on a median plane (M) between the first and the second reference planes (P1, P2), and intersects the peripheral surface (26) at two median insert symmetry points (56);

each of the median insert symmetry points is formed at the intersection of a first reference line (L1) with a second reference line (L2), as seen in a first side view of the cutting insert that is perpendicular to a given secondary cutting edge;

the first reference line (L1) connects the leading end (36, 136) of a first main cutting edge (32, 132) of a given end surface (28, 128) with the leading end (36, 136) of a first main cutting edge (32, 132) of an opposite end surface (28, 128); and the second reference line (L2) connects the trailing end (42, 142) of a second main cutting edge (34, 134) of a given end surface (28) with the trailing end (42, 142) of a second main cutting edge (34, 134) of an opposite end surface (28).

13. The cutting insert (18, 118) according to claim 12, wherein the first cutting edge axis (A1) and the second cutting edge axis (A2) are located at opposite sides of an imaginary plane (N) that is perpendicular to a symmetry plane (SP) that contains the first axis of symmetry (B) and the second symmetry axis (S).

14. The cutting insert (18,118) according to claim 13, wherein:

each side abutment surface of the first pair of side abutment surfaces (58) converges towards each other in a direction toward the upper surface (22, 122);

each side abutment surface of the second pair of side abutment surfaces (60) converges towards each other in a direction toward the lower surface (24, 124);

each side abutment surface of the third pair of side abutment surfaces (62) converges towards each other in a direction toward the upper surface (22, 122); and each side abutment surface of the fourth pair of side abutment surfaces (64) converges towards each other in a direction toward the lower surface (24, 124).

15. The cutting insert (18, 118) according to claim 14, wherein:

the third pair of side abutment surfaces (62) has 180° rotational symmetry with the fourth pair of side abutment surfaces (64) around the symmetry axis (S).

16. The cutting insert (18, 118) according to claim 15, wherein:

the first pair of side abutment surfaces (58) converge towards each other in a direction toward the upper surface (22, 122) as viewed in a cross-section taken in a first section plane (P3), the first section plane contains the through bore axis (B) and is obliquely disposed, as seen in an end view of the cutting insert, with respect to a symmetry plane (SP) containing the through bore axis (B) and the symmetry axis (S).

17. The cutting insert (18, 118) according to claim 16, wherein:

the second pair of side abutment surfaces (60) converge towards each other in a direction toward the lower surface (24, 124) as viewed in a cross-section taken in a second section plane (P4), the second section plane (P4) contains the through bore axis (B) and is obliquely disposed at a plane angle ($\phi$), as seen in a top view of the cutting insert, with respect to the symmetry plane (SP) and with respect to the first section plane (P3).

18. The cutting insert (18, 118) according to claim 17, wherein:

the plane angle ($\phi$) is 80°.

19. The cutting insert (18, 118) according to claim 17, wherein:

the peripheral surface (26) forms with the first reference plane (P1) and with the second reference plane (P2) an obtuse first internal included angle ($\alpha$), as seen in a first side view of the cutting insert that is perpendicular to a secondary cutting edge (44, 50, 144, 150); and the peripheral surface (26) forms with the first reference plane (P1) and with the second reference plane (P2) an acute second internal included angle ($\beta$), as seen in a second side view of the cutting insert that is perpendicular to the first side view.

20. A cutting insert (218) for retention in a rotating cutting tool (10) having an axis of rotation (A), the cutting insert comprising:

two opposing end surfaces (228) and a peripheral surface (226) extending therebetween, each end surface having a mutual first axis of symmetry (B) passing through the end surfaces about which each end surface has 180° rotational symmetry;

a peripheral cutting edge (266) formed at the junction between a first end surface, constituting an upper surface (222), and the peripheral surface, the peripheral cutting edge comprising two curved cutting edges (232, 234) merging with two straight cutting edges which extend between the curved cutting edges at extremities thereof;

a continuously extending rake surface (268) extends inwardly from the peripheral cutting edge, the rake surface is slanted at a rake slant angle ($\lambda$) with respect to a second end surface, constituting a lower surface (224);

the upper surface comprises a rake inner extremity (92) at the innermost extremity of the rake surface and a bore upper end (96) at the uppermost end of a through bore (30) that extends between the end surfaces, a length between a given point (98) on the peripheral cutting edge and the rake inner extremity comprises a first rake length (H1) and a length between the given point and the bore upper end comprises a second rake length (H2), the first rake length and the second rake length taken in a plane parallel to the lower surface; wherein:

the rake slant angle is equal to or greater than 25°;

a rake extension ratio (E), defined as a ratio between the first rake length (H1) and the second rake length (H2), is smaller than 1 and equal to or greater than 0.8; and a major angular portion (MP11, MP12) of each of the curved cutting edges lies on a torus and extends along an angle equal to or larger than 120° as seen along the first axis of symmetry (B).

21. The cutting insert (218) according to claim 20, wherein the peripheral surface comprises:

a first (258) pair of side abutment surfaces that converge towards each other in a direction toward the upper surface; and a third (262) pair of side abutment surfaces that converge towards each other in a direction toward the upper surface.

22. A cutting tool (10) having a longitudinal axis of rotation (A) and comprising:

a tool body (12) having at least one insert pocket (14) formed in a front end (16) of the tool body and a cutting insert (18, 118) retained in the at least one insert pocket, wherein:

the at least one insert pocket comprises:

a pocket base abutment surface (74);

a threaded bore (76) extending tangentially rearwardly from the pocket base abutment surface;

pocket side walls (78) extending upwardly from the pocket base abutment surface and comprising a first pocket abutment surface (80) forming an acute first pocket internal angle ($\gamma$) with the pocket base abutment surface, and a second pocket abutment surface (82) forming an acute second pocket internal angle ($\delta$) with the pocket base abutment surface, the first and second pocket abutment surfaces being spaced apart from one another; and the cutting insert (18, 118) comprises:

two opposing end surfaces (28, 128) and a peripheral surface (26) extending therebetween, each end surface having a mutual first axis of symmetry (B) passing through the end surfaces about which each end surface has N-fold rotational symmetry for some value of N where N is a number from the group consisting of 2, 3 and 4;

a peripheral cutting edge (66, 166) formed at the junction between each end surface and the peripheral surface, the peripheral cutting edge comprising N curved cutting edges (32, 34; 132, 134) merging with N straight cutting edges (44, 50; 144, 150) which extend between the curved cutting edges at extremities thereof, wherein the curved cutting edges of the two end surfaces are not aligned, as seen in an end view of the cutting insert.

23. The cutting tool according to claim 22, wherein:

the cutting insert further comprises first (58), second (60), third (62) and fourth (64) pairs of side abutment surfaces, each pair of the side abutment surfaces having 180° rotational symmetry around the through bore axis (B), wherein:

the first pair of side abutment surfaces (58) converge towards each other in a direction toward the upper surface (22, 122), the second pair of side abutment surfaces (60) converge towards each other in a direction toward the lower surface (24, 124), the third pair of side abutment surfaces (62) converge towards each other in a direction toward the upper surface (22, 122), the fourth pair of side abutment surfaces (64) converge towards each other in a direction toward the lower surface (24, 124), the third pair has 180° rotational symmetry with the fourth pair around a second symmetry axis (S) that passes between the third pair and the fourth pair, the upper surface defines a first reference plane (P1) and the lower surface defines a second reference plane (P2), the first and second reference planes are parallel to a median plane (M) that is located midway between the upper surface and the lower surface;

the peripheral surface (26) forms with the first reference plane (P1) and with the second reference plane (P2) an obtuse first internal included angle (a), as seen in a first side view of the cutting insert that is perpendicular to a given secondary cutting edge;

the peripheral surface (26) forms with the first reference plane (P1) and with the second reference plane (P2) an acute second internal included angle (β), as seen in a second side view of the cutting insert that is perpendicular to the first side view:

the upper surface (22, 122) is provided with a planar upper central abutment surface (70, 170), constituting an insert upper base abutment surface, that extends inwardly from an associated rake surface (68, 168) toward the through bore (30); and the lower surface (24, 124) is provided with a planar lower central abutment surface (72), constituting an insert lower base abutment surface, that extends inwardly from the associated rake surface (68, 168) toward the through bore (30);

wherein, in a retained position of the cutting insert (18, 118):

the insert lower base abutment surface (72) abuts the pocket base abutment surface (74);

one abutment surface of the insert first pair of side abutment surfaces (58) abuts the first pocket abutment surface (80);

one abutment surface of the insert third pair of side abutment surfaces (62) abuts the second pocket abutment surface (82); and a clamping screw (20) passes through the through bore (30) of the cutting insert and threadingly engages the threaded bore (76) of the insert pocket.

24. The cutting tool (10) according to claim 23, wherein:

the at least one insert pocket (14) is provided with a pocket abutment relief surface (84) that is located above the second pocket abutment surface (82), the pocket abutment relief surface being relieved from the adjacent abutment surface of the insert fourth pair of side abutment surfaces (64) in a retained position of the cutting insert.

25. The cutting tool (10) according to claim 22, wherein:

the cutting insert (18, 118) is four times indexable within the at least one insert pocket (14).

26. The cutting tool (10) according to claim 22, wherein:

the first pocket abutment surface (80) forms with the second pocket abutment surface (82) an acute pocket angle (θ) as seen in a top view of the at least one insert pocket (14).

27. The cutting tool (10) according to claim 22, wherein:

the at least one insert pocket (14) is provided with a pocket relief channel (86) located between the pocket side walls (78) and the pocket base abutment surface (74).

*28. A double-sided cutting insert for retention in a rotating cutting tool having an axis of rotation, the cutting insert comprising:*

*two opposing end surfaces and a peripheral surface extending therebetween, each end surface having a mutual first axis of symmetry (B) passing through the end surfaces about which each end surface has N-fold rotational symmetry, where N is a number from the group consisting of 2 and 4;*

*a peripheral cutting edge formed at the junction between each end surface and the peripheral surface, the peripheral cutting edge comprising N curved cutting edges merging with N straight cutting edges which extend between the curved cutting edges at extremities thereof; wherein:*

*the curved cutting edges of the two end surfaces are not aligned, in a direction along the first axis of symmetry (B);*

*the cutting insert comprises a through bore, having a through bore axis (B) constituting the first axis of symmetry, that extends between the two end surfaces; and*

*the peripheral surface comprises first, second, third and fourth pairs of side abutment surfaces, each pair of side abutment surfaces having 180° rotational symmetry around the through bore axis (B).*

*29. The cutting insert according to claim 28, wherein:*

*in a top view of the cutting insert, the curved cutting edges are longer than the straight cutting edges.*

*30. The cutting insert according to claim 29, wherein:*

*N=4 and the cutting insert has eight curved cutting edges.*

*31. The cutting insert according to claim 29, wherein:*

*one extremity of any given curved cutting edge is located further from a median plane of the cutting insert than the other extremity of the given curved cutting edge, the median plane being located midway between the end surfaces.*

*32. The cutting insert according to claim 31, wherein:*

*the curved cutting edges associated with one of the end surfaces define a first reference plane and the curved cutting edges associated with the other end surface define a second reference plane, with the entire cutting insert being located between the first reference plane and the second reference plane; and*

*the first and second reference planes are parallel to each other and located equidistant from and on either side of the median plane of the cutting insert.*

*33. The cutting insert according to claim 32, wherein:*

*at each end surface, the N curved cutting edges and the N straight cutting edges form a continuously extending peripheral cutting edge that is associated with a rake surface that extends continuously along the entire circumference of that end surface;*

*the rake surface merges with a central abutment surface; and*

*the entire central abutment surface is located closer to the median plane than the reference plane associated with that end surface.*

*34. The cutting insert according to claim 33, wherein:*

*at said each end surface, the rake surface merges with the upper central abutment surface through an undercut.*

*35. The cutting insert according to claim 32, wherein:*

*the cutting insert has 180° rotational symmetry around a second symmetry axis (S), the second symmetry axis lies on the median plane between the first and the second reference planes and intersects the peripheral surface at two median insert symmetry points.*

36. The cutting insert according to claim 29, wherein:

the curved cutting edges associated with one of the end surfaces are located in a first reference plane and the curved cutting edges associated with the other end surface are located in a second reference plane, with the entire cutting insert being located between the first reference plane and the second reference plane; and the first and second reference planes are parallel to each other and located equidistant from and on either side of a median plane of the cutting insert, the median plane being located midway between the end surfaces.

37. The cutting insert according to claim 36, wherein:

at each end surface, the N curved cutting edges and the N straight cutting edges form a continuously extending peripheral cutting edge that is associated with a rake surface that extends continuously along the entire circumference of that end surface;

the rake surface merges with a central abutment surface; and the entire central abutment surface is located closer to the median plane than the reference plane associated with that end surface.

38. The cutting insert according to claim 37, wherein:

at said each end surface, the rake surface merges with the upper central abutment surface through an undercut.

39. The cutting insert according to claim 36, wherein:

the cutting insert has 180° rotational symmetry around a second symmetry axis (S), the second symmetry axis lies on the median plane between the first and the second reference planes and intersects the peripheral surface at two median insert symmetry points.

40. A cutting tool having a longitudinal axis of rotation (A) and comprising:

a tool body having at least one insert pocket formed in a front end of the tool body and a cutting insert in accordance with claim 28 retained in the at least one insert pocket, wherein:

the at least one insert pocket comprises:

a pocket base abutment surface; and a threaded bore extending tangentially rearwardly from the pocket base abutment surface.

41. The cutting insert according to claim 28, wherein:

a section plane containing the through bore axis (B) and any point on any one of the straight cutting edges intersects an adjacent side abutment surface which slopes inwardly with respect to the through bore axis (B), in an axial direction away from an associated end surface and towards the opposite end surface.

42. A double-sided cutting insert for retention in a rotating cutting tool having an axis of rotation, the cutting insert comprising:

two opposing end surfaces and a peripheral surface extending therebetween, each end surface having a mutual first axis of symmetry (B) passing through the end surfaces about which each end surface has N-fold rotational symmetry, where N is a number from the group consisting of 2 and 4;

a peripheral cutting edge formed at the junction between each end surface and the peripheral surface, the peripheral cutting edge comprising N curved cutting edges merging with N straight cutting edges which extend between the curved cutting edges at extremities thereof; wherein:

in a top view of the cutting insert, the curved cutting edges are longer than the straight cutting edges;

a median plane of the cutting insert is located midway between the end surfaces;

one extremity of any given curved cutting edge is located further from the median plane than the other extremity of the given curved cutting edge;

the cutting insert comprises a through bore, having a through bore axis (B) constituting the first axis of symmetry, that extends between the two end surfaces; and the peripheral surface comprises first, second, third and fourth pairs of side abutment surfaces, each pair of side abutment surfaces having 180° rotational symmetry around the through bore axis (B).

43. The cutting insert according to claim 42, wherein:

N=4 and the cutting insert has eight curved cutting edges.

44. The cutting insert according to claim 42, wherein:

the curved cutting edges associated with one of the end surfaces define a first reference plane and the curved cutting edges associated with the other end surface define a second reference plane, with the entire cutting insert being located between the first reference plane and the second reference plane; and the first and second reference planes are parallel to each other and located equidistant from and on either side of the median plane of the cutting insert.

45. The cutting insert according to claim 44, wherein:

at each end surface, the N curved cutting edges and the N straight cutting edges form a continuously extending peripheral cutting edge that is associated with a rake surface that extends continuously along the entire circumference of that end surface;

the rake surface merges with a central abutment surface; and the entire central abutment surface is located closer to the median plane than the reference plane associated with that end surface.

46. The cutting insert according to claim 45, wherein:

at said each end surface, the rake surface merges with the upper central abutment surface through an undercut.

47. The cutting insert according to claim 42, wherein:

the cutting insert has 180° rotational symmetry around a second symmetry axis (S), the second symmetry axis lies on the median plane between the first and the second reference planes and intersects the peripheral surface at two median insert symmetry points.

48. The cutting insert according to claim 42, wherein:

a section plane containing the through bore axis (B) and any point on any one of the straight cutting edges intersects an adjacent side abutment surface which slopes inwardly with respect to the through bore axis (B), in an axial direction away from an associated end surface and towards the opposite end surface.

* * * * *